June 5, 1928.

C. D. CUTTING 1,672,484

UNIVERSAL JOINT

Filed May 31, 1927

INVENTOR.
CHARLES. D. CUTTING.
BY
ATTORNEYS.

Patented June 5, 1928.

1,672,484

UNITED STATES PATENT OFFICE.

CHARLES D. CUTTING, OF DETROIT, MICHIGAN.

UNIVERSAL JOINT.

Application filed May 31, 1927. Serial No. 195,156.

My invention has to do with universal joints and has for its particular object the provision of a simple and economical joint as well as one which can be easily and quickly assembled.

With the above and other objects in view, my invention consists in the arrangement, combination and construction of the various parts of my improved device, as described in the specification, claimed in my claims and shown in the accompanying drawings, in which:

Figure 2:
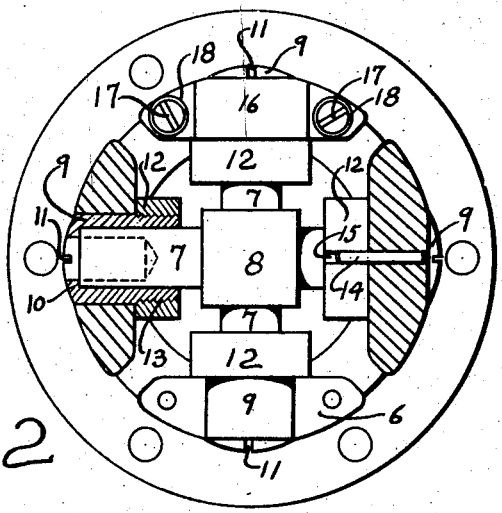
Fig. 2 is a sectional view taken substantially on line 2—2 of Fig. 1.
Figure 1:
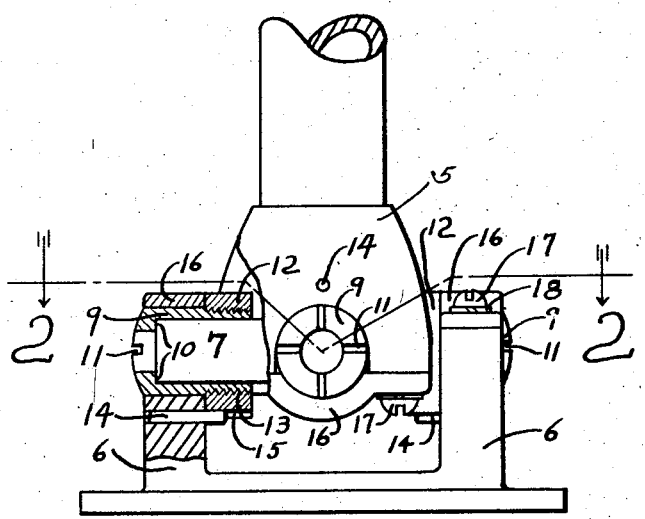
Fig. 1 is a plan view with certain parts broken away of a universal joint illustrating my invention.

I have shown a pair of yokes 5 and 6, the ends of the arms of which are open to receive the arms 7 which extend from the central portion 8 of a conventional Cardan cross. Positioned on each of the arms 7 is a sleeve 9 adapted to provide an end thrust bearing as at 10 for the cross arms. Each sleeve is provided with a groove 11 for the insertion of a screw driver or other suitable instrument to turn the sleeve in its nut 12. Such a nut is provided for each of the sleeves on the inside of each of the yoke arms, the engagement of sleeve and nut being thru the screw threads 13. A pin 14 is provided in each of the yoke arms and extends into a slot 15 in each of the nuts 12 so that the nuts are prevented from rotating while rotation of the sleeve in the nut will provide adjustment for the bearing 10 between the sleeve and its cross arm.

For the purpose of securing the sleeves and cross arms in the yoke arms, caps 16 are provided, one for each of the yoke arms, said caps being secured to the yoke arms by studs 17. When adjusting the sleeves for end thrust wear the studs 17 may be loosened. After the adjustment has been made the studs 17 may be tightened to prevent further turning of the sleeves 9 so as to lose the adjustment. Conventional lock washers 18 may be provided for each of the studs 17.

It will be obvious that various changes may be made in the arrangement, combination and construction of the various parts of my improved device, without departing from the spirit of my invention and it is my intention to cover by my claims such changes as may be reasonably included within the scope thereof.

What I claim is:

1. A universal joint comprising a pair of yokes and a cross member, a sleeve on each of the cross arms, positioned in the yoke arms, a nut threaded on the inner end of each sleeve for adjusting it and a pin in each yoke arm extended into its adjacent nut to prevent turning of the nut.

2. A universal joint comprising a pair of yokes and a cross member, a sleeve on each of the cross arms, positioned in the yoke arms, a nut threaded on the inner end of each sleeve for adjusting it, means on the outer end of each sleeve for turning the same, and a pin in each yoke arm extended into its adjacent nut to prevent turning of the nut.

3. A universal joint comprising a pair of yokes and a cross member, a sleeve on each of the cross arms, positioned in the yoke arms, an end thrust bearing in each sleeve for its cross arm, a nut threaded on the inner end of each sleeve for adjusting it and a pin in each yoke arm extended into its adjacent nut to prevent turning of the nut.

CHARLES D. CUTTING.